Nov. 9, 1965

F. G. LOGAN 3,217,186

CONTROL APPARATUS FOR BALANCING VOLTAGE DROPS ACROSS SERIES TRANSISTORS

Filed Sept. 30, 1963

2 Sheets-Sheet 1

INVENTOR.
FRANK G. LOGAN
BY [signature]
ATTY.
[signature]
AGENT.

INVENTOR.
FRANK G. LOGAN
BY [signature] ATTY.
[signature] AGENT.

United States Patent Office 3,217,186

Patented Nov. 9, 1965

3,217,186
CONTROL APPARATUS FOR BALANCING VOLTAGE DROPS ACROSS SERIES TRANSISTORS

Frank G. Logan, Annapolis, Md., assignor to the United States of America as represented by the Secretary of the Navy Filed Sept. 30, 1963, Ser. No. 312,804
9 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

This invention relates to voltage drop control apparatus and more particularly, to control apparatus for electrically controlling and balancing voltage drops across series related active circuit components transistors and the like.

In the past, attempts have been made to minimize voltage drops differences among series transistors by providing exactly matching pairs of transistors and by compensation thru the use of non-linear resistances in transistor bias circuits. These expedients are costly and do not work over wide temperature ranges. Previous compensation expedients are ineffective if the characteristics of the transistors change unequally with time.

Accordingly, it is an object of the present invention to provide positive balancing or equalization of the voltage drops across the collector and emitter circuits of series-connected transistors.

Another object of this invention is the provision of positive equalization for voltage drops in series transistors wherein the equalization is carried out by control circuits which are electrically isolated from the transistors.

Another object of the present invention is to provide a novel bridge-type transistor load control circuit.

Yet another object of this invention is the provision of a positive equalization control circuit for controlling voltage drops across series-connected active circuit components irregardless of the particular cause of said voltage drops.

In brief, the present invention takes the de facto condition of voltage drop inequality across series-connected active circuit components, such as transistors, and equalizes this condition regardless of its cause. The present invention is particularly useful for controlling transistor voltage drops because too great a load on one of a group of series-connected transistors may cause the overloaded transistor to burn out. Therefore, the present invention provides the advantage of increasing the reliability and useful life time of transistors especially in circuits where the transistors are subjected to variable voltage drop conditions. Example of such circuits are those used for degaussing coils and for reversible polarity D.C. amplifiers employed to drive magnetic amplifiers.

For a better understanding of the present invention, reference is made to the accompanying drawings in which like reference numerals indicate like parts and in which.

Figure 1:
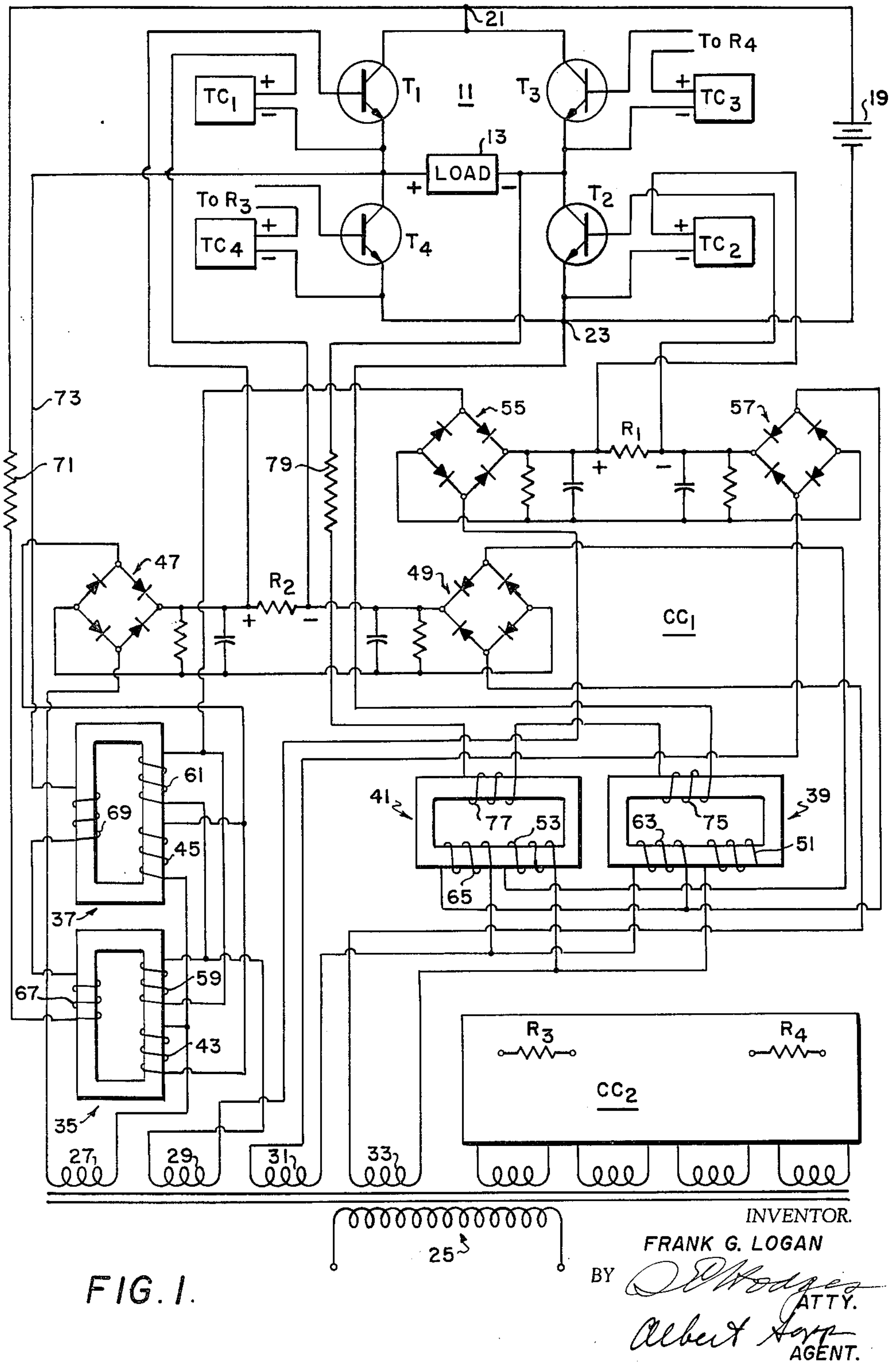
FIG. 1 is a schematic diagram of novel control apparatus for balancing voltage drops across series connected transistors, according to one version of the present invention.

Referring to FIG. 1, a transistor bridge circuit 11 has four NPN transistors $T_1$, $T_2$, $T_3$ and $T_4$ connected in common emitter configuration. The positive or "hole" current flow in each of said transistors is therefore from collector to emitter. Control of the voltage drop across each transistor is exercised by the amount of current flow between the base and emitter. As the base potential of an NPN transistor is made increasingly positive, the collector-emitter resistance decreases.

A load for which the D.C. potentials are to be controlled is designated as 13. The load 13 is connected to the bridge circuit 11 at junctions 15 and 17 respectively so that the transistors $T_1$ and $T_2$ of transistor pair $T_1$ and $T_2$ and the transistors of pair $T_3$ and $T_4$ are respectively connected in series with the load 13.

A source of reversible polarity D.C. is supplied to the load 13 by means of a battery 19. The battery 19 has its positive terminal connected to the transistor bridge at a bridge junction 21 and its negative terminal, at a bridge junction 23 so that the transistors $T_1$ and $T_2$ are series connected, and the transistors $T_3$ and $T_4$ are series connected.

The transistors $T_1$, $T_2$, $T_3$, $T_4$ are provided with respective control signal sources $TC_1$, $TC_2$, $TC_3$ and $TC_4$ which establish voltage drop command signal inputs to the transistors. Each of said control signal sources $TC_1$–$TC_4$ may be composed of a battery in series with a resistance element, or of any suitable source of variable D.C. potential. Each of the control signal sources $TC_1$–$TC_4$ has its negative terminal connected to the emitter of its respectively associated transistor $T_1$–$T_4$. The positive terminal of each signal control source $TC_1$–$TC_4$ is connected to the base of its associated transistor $T_1$–$T_4$ via a control resistance indicated as $R_2$ for transistor $T_1$, $R_1$ for transistor $T_2$, $R_4$ for transistor $T_3$ and $R_3$ for transistor $T_4$. As between resistor pair $R_1$ and $R_2$, (and $R_3$, $R_4$) the connections thereto from the respective control sources $TC_1$ and $TC_2$ (and $TC_3$,$TC_4$) are relatively opposite in polarity as indicated. In other words, whereas the base of $T_2$ is connected to the negative side of $R_1$, the base of $T_1$ is connected to the positive side of $R_2$. The control resistors $R_1$, $R_2$ are also connected to a compensation control circuit $CC_1$, (to be described in greater detail), and the pair $R_3$, $R_4$, to a compensation control circuit $CC_2$ (not shown in detail) identical to the control circuit $CC_1$. The control circuit $CC_2$ is indicated in the legended block.

Since control circuits $CC_1$ and $CC_2$ are identical and perform the same functions in relation to respective resistor pairs $T_1$, $T_2$ and $T_3$, $T_4$, only the control circuit $CC_1$ employed in conjunction with transistors $T_1$, $T_2$ need be described in detail.

The compensation control circuit $CC_1$ employs an alternating current input source 25 transformer-coupled to four input secondary windings 27, 29, 31 and 33 respectively as inputs for the control circuit $CC_1$. As indicated in FIG. 1, the control circuit $CC_2$, also has four input windings which function identically to the input windings 27, 29, 31 and 33.

Associated with the input secondary windings 27, 29, 31 and 33 are four transductors or saturable core reactors 35, 37, 39 and 41. The transductors employ both A.C. and D.C. windings. An important principle of transductors is that when the A.C. windings of a transductor are coupled to an A.C. source, the A.C. windings carry a current which, when rectified, delivers to a load circuit an average current which is an essentially direct reflection of the direct current in the transductor D.C. winding. Thus, the higher the current becomes in the D.C. winding, the higher becomes the A.C. winding current and the lower the A.C. winding potential drop.

The present invention advantageously employs the above principle relating to transductors. Specifically, one side of the input A.C. winding 27 is connected to a pair of parallel connected A.C. windings 43 and 45 of transductors 35 and 37 respectively. Output means in the form of a full wave diode rectifier 47 is connected across the other side of the A.C. input winding 27 and the transductor A.C. windings 43 and 45. As indicated the positive (+) output end of the rectifier 47 is connected to one end of the control resistor $R_2$.

In the same manner as the input A.C. winding 27 and transductor A.C. windings 43 and 45, the input A.C. winding 33 is connected to the input terminals of a full wave rectifier 49 via parallel-connected A.C. windings 51 and 53 of the respective transductors 39 and 41. The positive (+) output terminal of the full wave rectifier 49 is connected to the other negative (−) side of the control resistor $R_2$.

Connectively associated with the control resistor $R_1$ are full wave rectifiers 55 and 57 having their respective positive (+) end outputs connected to the resistor $R_1$ in exactly the same manner as described for the rectifiers 47 and 49 in conjunction with control resistor $R_2$.

The input A.C. winding 29 has one side thereof connected via parallel-connected transductor A.C. windings 59 and 61 to one input terminal of the full wave rectifier 55 and its other side to the other input terminal of rectifier 55 in exactly the same manner described in conjunction with circuit connections of the input winding 27. The input A.C. winding 31 is connected to the full wave rectifier 57 via parallel-connected A.C. windings 63 and 65 of transductors 39 and 41 respectively, in exactly the same manner as input A.C. winding 33 is connected to full wave rectifier 49.

The negative sides of the full wave rectifiers 47 and 49 and rectifiers 55 and 57 respectively are connected to each other thus completing the rectifier circuits. An R-C output filtering network is provided as shown for each diode rectifier.

There is also provided a D.C. control winding for each transductor. Specifically, transductors 35 and 37 are provided with parallel-connected D.C. windings 67 and 69 respectively. One side of the windings 67 and 69 is connected via a resistor 71 to the junction 21 on the collector side of transistor $T_1$. The other side of the windings 67 and 69 are connected via a lead 73 to the emitter side of transistor $T_1$.

In the like manner, the transductors 39 and 41 are respectively provided with parallel-connected D.C. control windings 75 and 77. One side of the D.C. windings 75 and 77 is connected via a resistor 79 to the collector side of the transistor $T_2$, and the other side of the said windings is connected to the emitter side of the transistor $T_2$ via a lead 81.

Thus, the collector/emitter electrodes of bridge transistors $T_1$ and $T_2$ are connected across their respective associated D.C. transductor windings.

It is to be understood that bridge transistors $T_3$ and $T_4$ are provided with compensation control circuitry $CC_2$ identical to $CC_1$ and connections therewith in exactly the same manner as illustrated for the transistors $T_1$ and $T_2$. Thus, as indicated, control resistors $R_4$ and $R_3$ are provided for transistors $T_3$ and $T_4$ respectively. Also, the collector-emitter terminals of the transistors $T_3$ and $T_4$ are respectively connected to transductor D.C. windings in the same manner as described in conjunction with the compensation control circuit $CC_1$.

In a self-saturating type transductor arrangement, the alternating current output of the A.C. transductor windings may be affected by the D.C. winding current in either one polarity or, preferably in both positive and negative polarities. For effecting changes in both polarities, each of the transductors may be provided with two adjacent core members between which the A.C. windings are wound thereby providing D.C. induced flux increasing or decreasing swings of current flow in the A.C. windings. Any other suitable A.C. winding arrangement may, of course, be employed.

The operation of the circuit of FIG. 1 will now be described with the assumption that the load 13 has the +, − polarity senses indicated in FIG. 1.

When the signal control sources $TC_1$ and $TC_2$ receive a signal calling for, say, a 50% of the maximum voltage across the load 13, ideally the transistors $T_1$ and $T_2$ should each drop 25% of the voltage. If it is assumed that the supply voltage from the battery 19 and the maximum load voltage are the same, and that transistors $T_1$ and $T_2$ each have zero forward drop, then the circuit conditions are:

(1) The direct currents thru the D.C. transductor windings 67, 69 and 75, 77 are the same;

(2) The A.C. potentials of all the transductor A.C. windings 43, 45, 59, 61 and 51, 53, 63 and 65 are the same;

(3) As the D.C. potentials across the output resistors of the full wave rectifiers 55 and 57 are the same as those for full wave rectifiers 47 and 49, no voltage drop appears across either control resistor $R_1$ or $R_2$.

Let it now be assumed that because of defects in the transistors $T_1$ and $T_2$, the transistor $T_1$ would drop 40% of the supply voltage and the transistor $T_2$, 10%.

If this voltage drop difference were uncompensated, the conditions in the circuit of FIG. 1 would be as follows:

(1) Transductor D.C. windings 67 and 69 would carry more current than transductor D.C. windings 75 and 77;

(2) The D.C. potentials across the output resistors of the full wave rectifiers 47 and 55 are greater than those across the output resistors of rectifiers 49 and 57. This rise in potential is brought about by the partial saturation of the transductor cores due to increased current flow in the D.C. windings 67 and 69. This partial saturation proportionately decreases the effective resistance to current flowing in the A.C. windings, 43, 45, 59 and 61;

(3) Therefore, potentials with the +, − polarity senses indicated appear across the control resistors $R_1$ and $R_2$.

In that the transistor $T_1$ is tending to drop in potential excessively of the potential drop in transistor $T_2$, the compensatory controls applied to transistors $T_1$ and $T_2$ are provided in the following manner, tracing voltages and control currents derived from control resistors $R_1$, $R_2$:

(1) Since the now positive sense terminal of control resistor $R_1$ is connected in series opposing relation to the positive terminal of control source $TC_{-2}$ the net base-emitter voltage of the transistor $T_2$ is reduced. Therefore the collector-emitter resistance is increased, thus increasing the voltage drop across transistor $T_2$;

(2) The connection from the positive (+) terminal of the control resistance $R_2$ is directly connected to the base of the transistor $T_1$ and the negative (−) sense terminal of $R_2$ is connected to the positive (+) terminal of control signal source $TC_1$. Thus the potentials across $R_2$ and the control source $TC_1$ are series aiding, increasing the base-emitter voltage and thus reducing the collector-emitter voltage drop of the transistor $T_1$.

With the above situation reversed, i.e., when transistor $T_1$ tends to drop less voltage than $T_2$, the polarities across resistors $R_1$ and $R_2$ become opposite to those in the above described example. Accordingly the voltages of the control source $TC_2$ and the control resistance $R_1$ would be series aiding and the collector-emitter drop of $T_2$ would be reduced. The voltages of $R_2$ and $TC_1$ would be in series opposition whereby the collector-emitter drop of $T_1$ would be increased.

Figure 2:
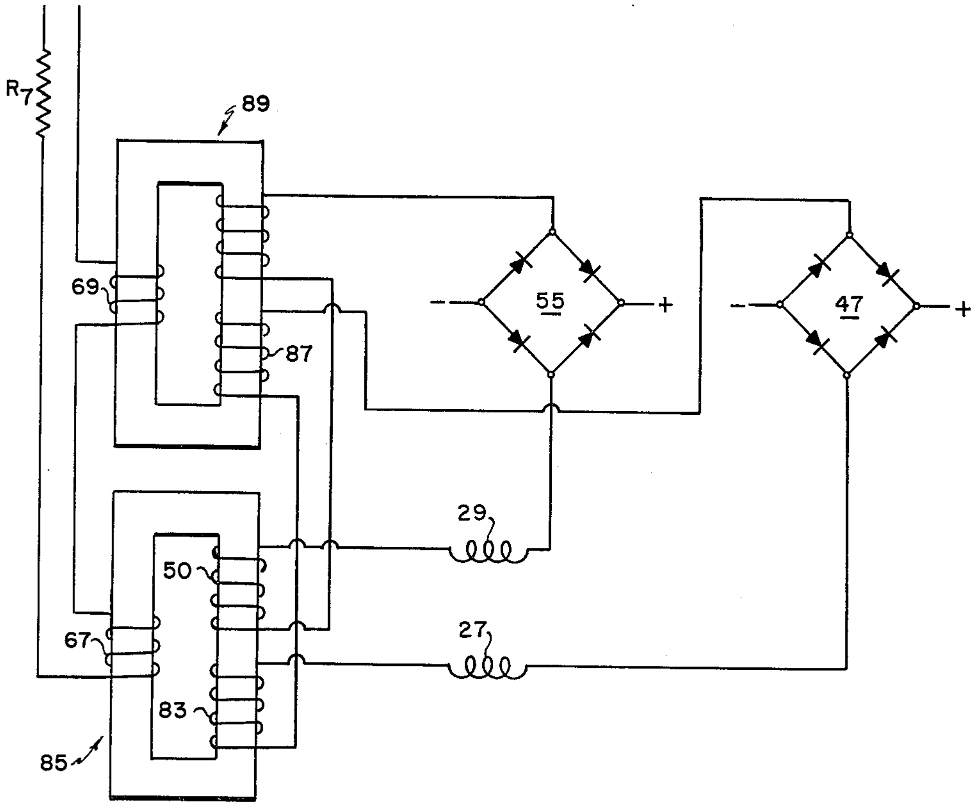
FIG. 2 is a schematic circuit diagram of a control portion of the circuit of FIG. 1 according to another version of the present invention.

An alternative transductor A.C. series winding arrangement is shown in FIG. 2. The A.C. input winding 27′ has one side connected to one end of a winding 83 on a first transductor core 85. The other end of the winding 83 is connected to one end of a winding 87 on a second transductor core 89, the other end of which is connected to one input terminal of the full wave rectifier 55. The other side of the input A.C. winding 27 is connected to the other input terminal of rectifier 47. Similar series-wound transductor A.C. windings would, of course, be provided for the two remaining A.C. input secondary windings for control circuit $CC_1$ and for the four input secondaries associated with control circuit $CC_2$.

Figure 3:
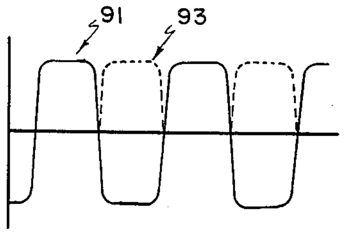
FIGS. 3 and 4 depict waveforms obtainable from the alternative versions of the circuit portions shown in FIGS. 1 and 2.

The advantage of the series winding arrangement of FIG. 2 over the parallel A.C. winding arrangement shown in FIG. 1 is that the series windings produce a rectangular-shaped wave output after rectification. In FIG. 3 the unrectified A.C. series winding output wave form is shown in solid lines 91, and the rectified waveform 93 in dashed lines, as a pilot of voltage (or current) vs. time.

Figure 4:
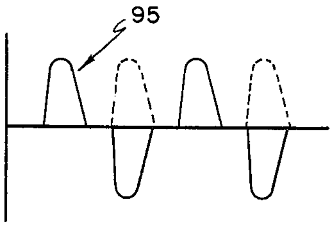

The parallel A.C. winding output waveform 95 before (dashed lines) and after rectification is shown in FIG. 4 which is a plot of voltage (or current) vs. time. The parallel winding output waveform is more triangular and obviously produces less harmonies than the series windings. The parallel winding output is thus more difficult to filter than the series winding output. However, with the series windings there is a greater tendency for an undesirable second harmonic to build up in the D.C. transductor windings.

The choice of whether series or parallel transductor windings should be used is determined by the potential level of the voltage to be measured and the amount of current which can be taken by the transductor D.C. windings. Generally, series-connected A.C. windings are preferable.

Although NPN transistors are employed in the version of the invention depicted in FIG. 1, it is understood that PNP transistors may be substituted therefor with appropriate changes in polarity connections throughout the circuit according to known principles.

Obviously many modifications and variations of the present invention are possible in the light of the above teachings. It is therefore to be understood that within the scope of the appended claims the invention may be practiced otherwise than as specifically described.

What is claimed is:

1. Apparatus for equalizing direct current voltage drops across series-connected first and second active circuit components, each of said active circuit components having a base, a collector and an emitter electrode, and there being a direct current voltage drop signal means having positive and negative sense terminals and being connected in the base-emitter circuit of each active circuit component for providing voltage drop command signals to said components, said apparatus comprising:

a source of supply voltage having each of its points of reference potential connected to like eletrodes of each active circuit component whereby series current flow is established between said active components;

a pair of magnetic core means for each active circuit component;

a direct current winding connected across the collector-emitter electrodes of each respective active circuit component and reactively coupled to a respectively associated pair of magnetic core means whereby the flow of current therein changeably affects the flux condition of said core means;

a source of alternating current;

a first pair and a second pair of conductive means coupled to said source of alternating current and reactively coupled to said first and second pairs respectively of said magnetic core means;

first and second output means connected in circuit with respective ones of said first pair of conductive means, and third and fourth output means connected in circuit with respective ones of said second pair of conductive means, whereby the voltage drop across each of said output means is at least approximately proportional to the amount of current flowing in the direct current winding of its associated magnetic core means;

first and second output control means for said first and second active circuit components respectively;

said first and second output control means having a positive sense terminal and a negative sense terminal;

said positive sense terminal of said first output control means being connected to said first output means and to the base electrode of the first active circuit component;

said negative sense terminal of said first output control means being connected to said third output means and to the positive sense terminal of the voltage drop signal means associated with the first active circuit component;

said positive sense terminal of said second output control means being connected to said second output means and to the negative sense terminal of the voltage drop signal means associated with the second active circuit component;

said negative sense terminal of said second output control means being connected to said fourth output means and to the base electrode of the second active circuit component;

whereby unfortuitously unequal voltage drops across the respective active circuit components are equalized responsive to voltage drops appearing on the respective output control means.

2. Apparatus according to claim 1 but further characterized by each of said active circuit components comprising transistors.

3. Apparatus according to claim 2 but further characterized by each of said magnetic core means comprising saturable reactors.

4. Apparatus according to claim 3 but further characterized by each of said output control means comprising a resistor.

5. Apparatus according to claim 4 but further characterized by each of said output means comprising a full wave rectifier and a smoothing filter circuit coupled to the output of said rectifier.

6. Apparatus for equalizing direct current voltage drops across series-connected first and second active circuit components, each of said active circuit components having a base, a collector and an emitter electrode, and there being a direct current voltage drop signal means having positive and negative sense terminals and being connected in the base-emitter circuit of each active circuit component for providing voltage drop command signals to said components, said apparatus comprising:

first reactive means coupled to the collector/emitter circuit of the first active circuit component for producing an alternating current voltage drop at least approximately inversely proportional to the collector/emitter current of the first active circuit component;

second reactive means coupled to the collector/emitter circuit of the second active circuit component for producing an alternating current voltage drop at least approximately inversely proportional to the collector/emitter current of the second active circuit component;

a source of potential for said first and second active circuit components;

a source of control voltage for each of said first and second active circuit components; and control means for each of the active circuit components and connected in circuit with each said control voltage source and the base electrode of its associated active circuit component respectively;

whereby upon the occurrence of voltage drop inequalities among said active circuit components, a potential occurs on said control means having a polarity sense to cause equalization of voltage drops across the collector/emitter electrodes of the active circuit componets.

7. Apparatus according to claim 6 but further characterized by each of the active circuit components comprising at least one transistor.

8. Apparatus according to claim 7 but further characterized by each of said first and second means comprising saturably reactive means.

9. Apparatus according to claim 7 but further characterized by each of said reactive means comprising transductors, each of said transductors having a direct current winding connected across the collector/emitter circuit of each of said transistors.

No references cited.

ARTHUR GAUSS, *Primary Examiner*.